United States Patent
Dunaway et al.

(10) Patent No.: US 11,779,189 B2
(45) Date of Patent: *Oct. 10, 2023

(54) SYSTEMS AND METHODS FOR PERFORMING A SOUS-VIDE COOKING CYCLE IN A DISHWASHER APPLIANCE

(71) Applicant: Haier US Appliance Solutions, Inc., Wilmington, DE (US)

(72) Inventors: Logan Chayse Dunaway, Greenville, IN (US); Duwayne Drexler, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/471,692

(22) Filed: Sep. 10, 2021

(65) Prior Publication Data

US 2023/0080263 A1 Mar. 16, 2023

(51) Int. Cl.
A47L 15/00 (2006.01)
A47L 15/42 (2006.01)
A47J 27/10 (2006.01)

(52) U.S. Cl.
CPC .......... *A47L 15/0097* (2013.01); *A47J 27/10* (2013.01); *A47L 15/4293* (2013.01)

(58) Field of Classification Search
None
See application file for complete search history.

(56) References Cited

U.S. PATENT DOCUMENTS

| 3,670,746 | A | * | 6/1972 | Gehrmann | F24C 15/18 |
| | | | | | 134/107 |
| 10,444,723 | B2 | | 10/2019 | Young et al. | |
| 2019/0231113 | A1 | | 8/2019 | Young et al. | |
| 2020/0146499 | A1 | | 5/2020 | Gagnon | |
| 2021/0038013 | A1 | | 2/2021 | Trice et al. | |

FOREIGN PATENT DOCUMENTS

| GB | 2381442 A | 5/2003 |
| HK | 30030506 A2 | 2/2021 |
| KR | 20060098799 A | 9/2006 |
| KR | 101831235 B1 | 2/2018 |

OTHER PUBLICATIONS

Can You Really Cook Salmon in a Dishwasher?, May 1, 2019, written by Christine Gallary, https://www.thekitchn.com/can-you-really-cook-salmon-in-a-dishwasher-putting-tips-to-the-test-in-the-kitchn-218048 (Year: 2019).*
https://anovaculinary.com/app/.
https://www.youtube.com/watch?v=gZ4atTn9B9Y.
This new countertop dishwasher is a game-changer for small kitchens, Mar. 27, 2018, written by Keith Barry, https://reviewed.usatoday.com/dishwashers/content/this-gorgeous-dishwasher-can-clean-your-plates-in-just-ten-minutes (Year: 2018).*

* cited by examiner

*Primary Examiner* — Rita P Adhlakha
(74) *Attorney, Agent, or Firm* — Dority & Manning, P.A.

(57) ABSTRACT

A method of controlling a dishwashing appliance may include determining that a cooking operation has been input to the dishwashing appliance via a mobile device, receiving an input option for the cooking operation via the mobile device, and activating the pump to supply a predetermined volume of fluid to the container at a predetermined temperature.

17 Claims, 9 Drawing Sheets

SYSTEMS AND METHODS FOR PERFORMING A SOUS-VIDE COOKING CYCLE IN A DISHWASHER APPLIANCE

FIELD OF THE INVENTION

The present subject matter relates generally to dishwasher appliances, and more particularly to methods for performing a sous-vide cooking cycle within a dishwasher appliance.

BACKGROUND OF THE INVENTION

A dishwasher or dishwashing appliances generally includes a tub that defines a wash chamber for receipt of articles for washing. Certain dishwashing appliances also include a rack assembly slidably mounted within the wash chamber. A user can load articles, such as plates, bowls, glasses, or cups, into the rack assembly, and the rack assembly can support such articles within the wash chamber during operation of the dishwashing appliance. Accordingly, to perform the washing operation, heated water is supplied to the wash chamber through various means (supplies, rotating arms, spray nozzles, etc.).

Further, household users have been increasingly performing cooking operations using a sous-vide method, involving submerging vacuum-sealed food products in heated water at a specified temperature for a predetermined amount of time. Existing sous-vide cooking appliances require a separate container for holding liquid, a temperature sensor submerged in the liquid, and a heating device to provide constant heat to the liquid. Such appliances can be costly to purchase, maintain, and operate.

Accordingly, a dishwashing appliance that obviates one or more of the above-mentioned drawbacks would be beneficial. In particular, a dishwashing appliance having the capability to perform a sous-vide cooking operation would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of controlling a dishwashing appliance is provided. The dishwashing appliance may include a tub defining a chamber, a fluid conduit provided within the chamber, a pump configured to urge fluid through the fluid conduit, and a container provided within the chamber and fluidly connected with the fluid conduit. The method may include determining that a cooking operation has been input to the dishwashing appliance; receiving an input option for the cooking operation; and activating the pump to supply a fluid to the container at a predetermined temperature.

In another exemplary aspect of the present disclosure, a method of performing a sous-vide cooking operation within a dishwashing appliance is provided. The dishwashing appliance may include a tub forming a chamber, a pump configured to deliver a fluid to the chamber, a container provided within the chamber, and a temperature sensor provided within the container. The method may include determining that the sous-vide cooking operation has been input to the dishwashing appliance; receiving an input option for the sous-vide cooking operation via a mobile device; determining a cooking time for the sous-vide cooking operation in response to receiving the input option; activating the pump to supply the fluid to the container; and monitoring a temperature of the fluid within the container via the temperature sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
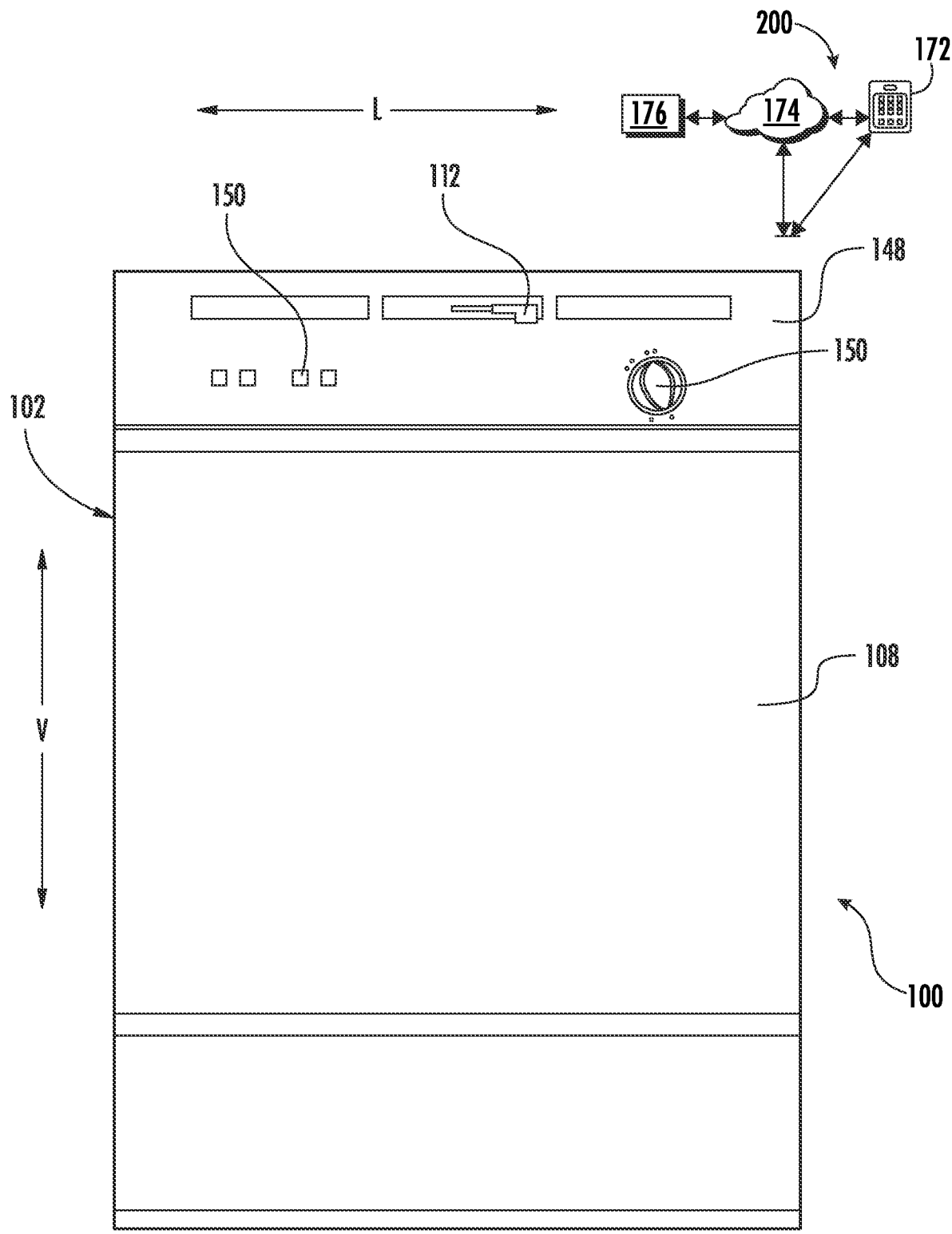
FIG. 1 provides a front elevation view of a dishwashing appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 2:
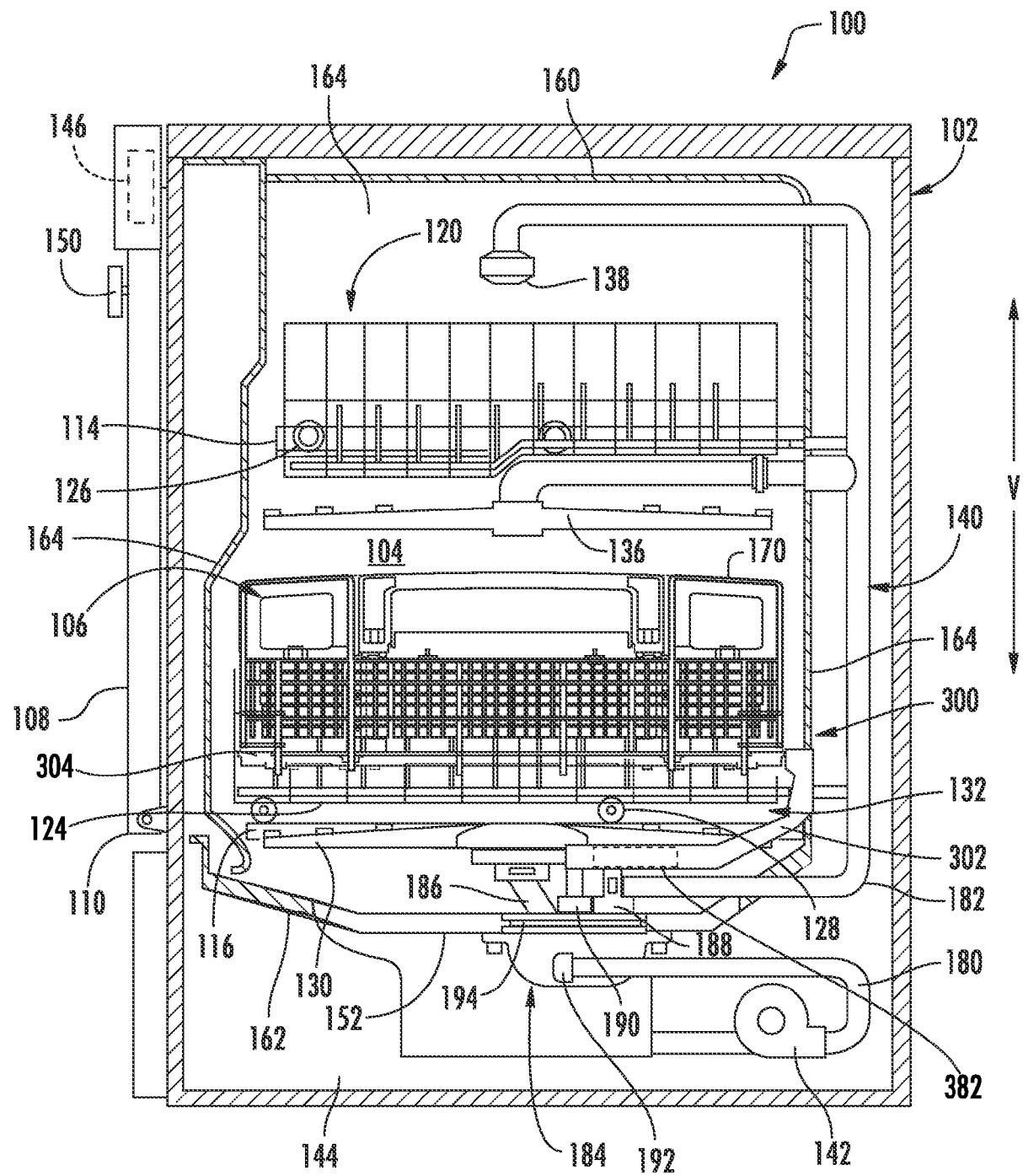
FIG. 2 provides sectional elevation view of the exemplary dishwashing appliance of FIG. 1.

Turning now to the figures, FIGS. 1 and 2 illustrate exemplary embodiments of a domestic dishwashing appliance 100 that may be configured in accordance with aspects of the present disclosure. As shown in FIGS. 1 and 2, the dishwashing appliance 100 may include a cabinet 102 having a tub 104 therein defining a chamber 106. The tub 104 may generally include a front opening (not shown) and a door 108 hinged at its bottom 110 for movement between a normally closed vertical position (shown in FIGS. 1 and 2), wherein the chamber 106 is sealed shut for operation, and a horizontal open position for loading and unloading of articles from the dishwasher. Optionally, a latch 112 may be used to lock and unlock the door 108 for access to the chamber 106.

Generally, the tub 104 may define a discrete vertical direction V, lateral direction L, and transverse direction T. Vertical direction V, lateral direction L, and transverse direction T are orthogonally oriented such that vertical direction V, lateral direction L, and transverse direction T form an orthogonal directional system.

As is understood, the tub 104 may generally have a rectangular cross-section defined by various wall panels or walls. For example, as shown in FIG. 2, the tub 104 may include a top wall 160 and a bottom wall 162 spaced apart from one another along a vertical direction V of the dishwashing appliance 100. Additionally, the tub 104 may include a plurality of sidewalls 164 (e.g., three sidewalls) extending between the top and bottom walls 160, 162. It should be appreciated that the tub 104 may generally be formed from any suitable material. For instance, in several embodiments, the tub 104 is formed from a ferritic material, such as stainless steel, or a polymeric material.

As particularly shown in FIG. 2, upper and lower guide rails 114, 116 may be mounted on opposing sidewalls 164 of the tub 104 and may be configured to accommodate roller-equipped rack assemblies 120 (e.g., an upper rack assembly and a lower rack assembly). Each of the rack assemblies 120 may be fabricated into lattice structures including a plurality of elongated members 124 (for clarity of illustration, not all elongated members making up assemblies 120 are shown in FIG. 2). Additionally, each rack 120 may be adapted for movement between an extended loading position (not shown) in which the rack 120 is substantially positioned outside the chamber 106, and a retracted position (shown in FIGS. 1 and 2) in which the rack 120 is located inside the chamber 106. This may be facilitated by rollers 126 and 128, for example, mounted onto upper rack and lower rack 120, respectively.

In some embodiments, a basket 170 is removably mounted to lower rack assembly. In additional or alternative exemplary embodiments, the basket can be selectively or removably attached to other portions of dishwashing appliance 100 (e.g., upper rack assembly 120 or door 108). The basket 170 defines one or more storage chambers and is generally configured to receive silverware, flatware, utensils, and the like, that are too small to be accommodated by the upper and lower rack assemblies 120, 122. The basket 170 may be constructed of any suitable material (e.g., metal or polymer) and define a plurality of fluid slots for permitting wash fluid therethrough.

The dishwashing appliance 100 includes one or more spray assemblies housed within the wash chamber 106. For instance, the dishwashing appliance 100 may include a lower spray-arm assembly 130 that is rotatably mounted within a lower region 132 of the chamber 106 directly above the bottom wall 162 of the tub 104 so as to rotate in relatively close proximity to the rack assembly 122. As shown in FIG. 2, a mid-level spray-arm assembly 136 may be located in an upper region of chamber 106, such as by being located in close proximity to the upper rack 120. Moreover, an upper spray assembly 138 may be located above the upper rack 120.

As is generally understood, the lower and mid-level spray-arm assemblies 130, 136 and the upper spray assembly 138 may generally form part of a fluid circulation assembly 140 for circulating fluid (e.g., water and dishwasher fluid) within the tub 104. As shown in FIG. 2, the fluid circulation assembly 140 may also include a pump 142 located in a machinery compartment 144 located below the bottom wall 162 of the tub 104. One or all of the spray assemblies 130, 136, 138 may be in fluid communication with the pump 142 (e.g., to receive a pressurized wash fluid therefrom). Additionally, each spray-arm assembly 130, 136 may include an arrangement of discharge ports or orifices for directing washing liquid onto dishes or other articles located in rack assemblies 120 and 122, which may provide a rotational force by virtue of wash fluid flowing through the discharge ports. The resultant rotation of the lower spray-arm assembly 130 provides coverage of dishes and other dishwasher contents with a spray (e.g., a spray of wash fluid).

It should be appreciated that, although the dishwashing appliance 100 will generally be described herein as including three spray assemblies 130, 136, 138, the dishwashing appliance may, in alternative embodiments, include any other number of spray assemblies, including two spray assemblies, four spray assemblies or five or more spray assemblies. For instance, in addition to the lower and mid-level spray-arm assemblies 130, 136 and the upper spray assembly 138 (or as an alternative thereto), the dishwashing appliance 100 may include one or more other spray assemblies or zones for distributing fluid within the chamber 106. For instance, as will be explained in more detail below, an operation may include supplying water via only one assembly (e.g., a supply conduit).

In addition to the three spray assemblies 130, 136, 138, the appliance 100 may also include a variable jet assembly 300 disposed within the chamber 106. In some embodiments, the variable jet assembly 300 can remain generally stationary during use of the dishwashing appliance 100 (e.g., such that there is no intentional movement of variable jet assembly 300 outside of vibration, etc.). In additional or alternative embodiments, one or more movable nozzles (not pictured) may be provided on a manifold body 304 to rotate during use of the dishwashing appliance 100 (e.g., while manifold body 304 remains stationary).

The variable jet assembly 300 may be positioned to alternately direct fluid to multiple predetermined locations within the chamber 106 (e.g., different subsections of the chamber 106 or a corresponding rack 314). For instance, the variable jet assembly 300 may be disposed within wash tub 104 (e.g., on or within the lower rack assembly 122) and directed toward a discrete first spray or supply zone and second spray or supply zone of the basket 170. In exemplary embodiments, the variable jet assembly 300 may provide advantageously focused cleaning to utensils at different portions of basket 170. Additionally or alternatively, delivery of fluid may be advantageously determined or influenced based on where utensils are within basket 170. Further additionally or alternatively, delivery of fluid from variable jet assembly 300 may be provided to an accessory basket or container (e.g., as a supplied fluid via an inlet as opposed to sprayed).

The dishwashing appliance 100 may be further equipped with a controller 146 configured to regulate operation of the dishwasher 100. The controller 146 may generally include one or more memory devices and one or more microprocessors, such as one or more general or special purpose microprocessors operable to execute programming instructions or micro-control code associated with a cleaning cycle. The memory may represent random access memory such as DRAM, or read only memory such as ROM or FLASH. In some embodiments, the processor executes programming instructions stored in memory. The memory may be a separate component from the processor or may be included onboard within the processor.

The controller 146 may be positioned in a variety of locations throughout dishwashing appliance 100. In the illustrated embodiment, the controller 146 is located within a control panel area 148 of the door 108, as shown in FIG. 1. In such an embodiment, input/output ("I/O") signals may be routed between the control system and various operational components of dishwashing appliance 100 along wiring harnesses that may be routed through the bottom 110 of the door 108. Typically, the controller 146 includes a user interface panel/controls 150 through which a user may select various operational features and modes and monitor progress of the dishwasher 100. In one embodiment, the user interface 150 may represent a general purpose I/O ("GPIO") device or functional block. Additionally, the user interface 150 may include input components, such as one or more of a variety of electrical, mechanical or electro-mechanical input devices including rotary dials, push buttons, and touch pads. The user interface 150 may also include a display component, such as a digital or analog display device designed to provide operational feedback to a user. The user interface 150 may be in communication with the controller 146 via one or more signal lines or shared communication busses.

Additionally, as shown in FIG. 2, a portion of the bottom wall 162 of the tub 104 may be configured as a tub sump portion 152 that is configured to accommodate one or more components of the fluid recirculation assembly 140 (e.g., a filter assembly (not shown) or other components). It should be appreciated that, in several embodiments, the bottom wall 162 of the tub 104 may be formed as a single, unitary component such that the tub sump portion 152 as well as the surrounding portions of the bottom wall 162 are formed integrally with one another. Alternatively, the tub sump portion 152 may be configured as a separate component configured to be attached to the remaining portion(s) of the bottom wall 162.

Moreover, as shown in FIG. 2, the fluid recirculation assembly 140 may also include a diverter assembly 184 in fluid communication with the pump 142 for diverting fluid between one or more of the spray-arm assemblies 130, 136, 138. For example, the diverter assembly 184 may, in several embodiments, include an inlet 192 coupled to the pump 142 (e.g., via pump conduit 180 shown in FIG. 2) for directing fluid into the diverter assembly 184 and first and second outlets 186, 188 for directing the fluid received from the pump 142 to the lower spray-arm assembly 130 or the mid-level and upper spray-arm assemblies 136, 138, respectively. In some such embodiments, the first outlet 186 may be configured to be directly coupled to the lower spray-arm assembly 130 and the second outlet 188 may be coupled to a suitable fluid conduit 182 of the fluid recirculation assembly 140 for directing fluid to the mid-level and upper spray-arm assemblies 136, 138. Optionally, a third outlet 190 may direct the fluid received from the pump 142 to the variable jet assembly 300. Additionally, the diverter assembly 184 may also include a diverting valve 194 to selectively divert the flow of fluid through the assembly 184 to the first outlet 186, the second outlet 188, or the third outlet 190.

It should be appreciated that the present subject matter is not limited to any particular style, model, or configuration of dishwashing appliance. The exemplary embodiments depicted in FIGS. 1 and 2 are simply provided for illustrative purposes only. For example, different locations may be provided for the user interface 150, different configurations may be provided for the racks 120, 122, and other differences may be applied as well.

Figure 3:
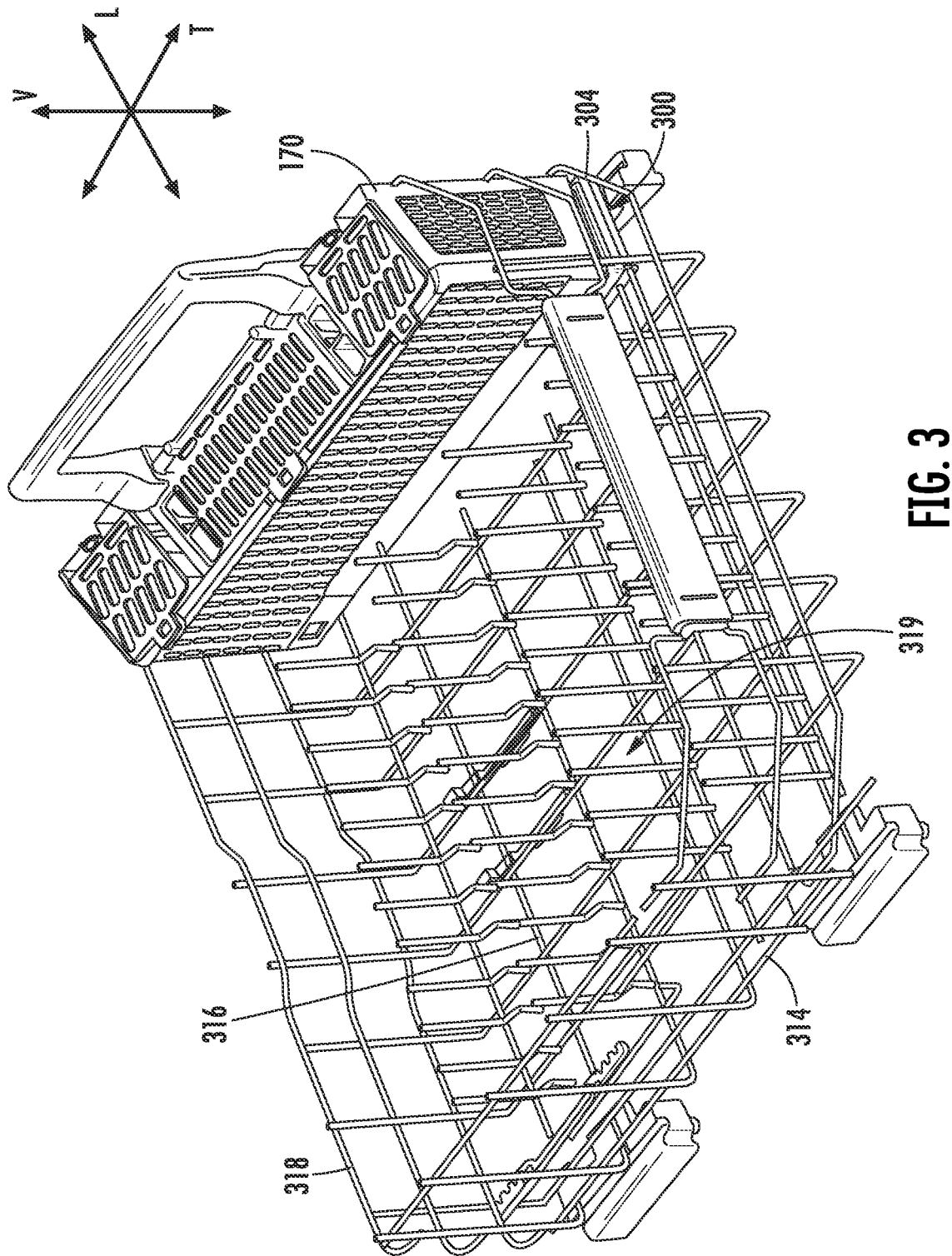
FIG. 3 provides a perspective view of several components of the exemplary dishwashing appliance of FIG. 2, including a rack assembly and variable jet assembly.
Figure 4:
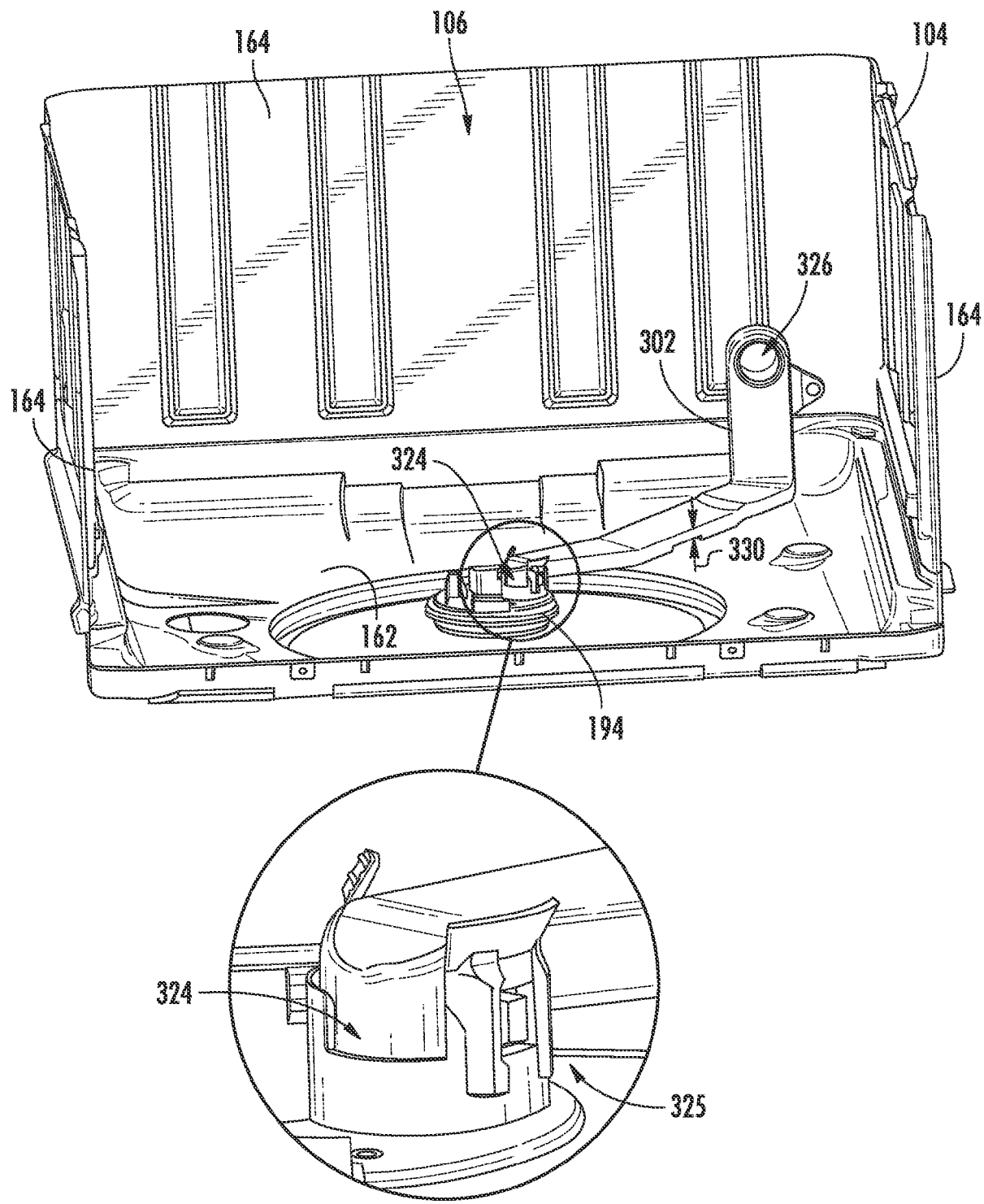
FIG. 4 provides a perspective view of a portion of the exemplary dishwashing appliance of FIG. 2, including a magnified view of a portion of a fluid conduit.
Figure 5:
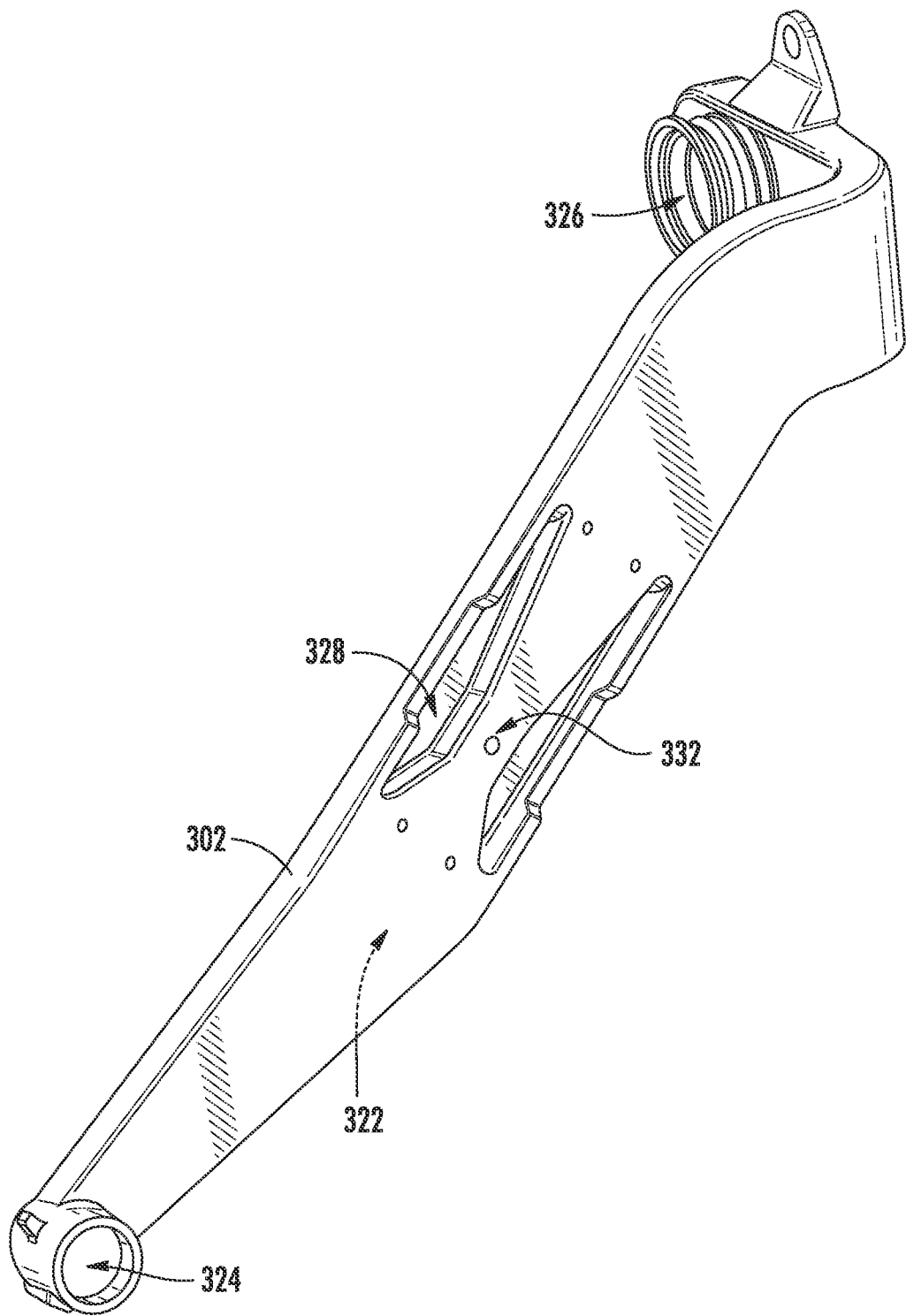
FIG. 5 provides a bottom perspective view of the fluid conduit of the exemplary dishwashing appliance of FIG. 2.

Referring now to FIGS. 3 through 5, several views of an exemplary embodiment of the variable jet assembly 300, including components thereof, are provided. Variable jet assembly 300 may include a fluid conduit 302 and manifold body 304 in selective fluid communication with pump 142 (FIG. 2). Generally, variable jet assembly 300 may define a discrete first supply zone and second supply zone at which water or wash fluid may be dispensed (e.g., from pump 142 or diverter assembly 184). In some embodiments, first supply zone is configured to receive one or more elongated utensils (e.g., bottles). In additional or alternative embodiments, first supply zone is configured to receive a container to store water or wash fluid therein. In still additional or alternative embodiments, the basket 170 can be selectively positioned or mounted proximate to the variable jet assembly 300 (e.g., at second spray zone).

In some embodiments, at least a portion of the variable jet assembly 300 (e.g., the manifold body 304) is mounted to a rack assembly 314. It should be noted that the rack assembly 314 may be embodied as a lower rack assembly 122 or an upper rack assembly 120, as illustrated in FIG. 2. In turn, in some embodiments wherein the rack assembly 314 is a lower rack assembly 122, the upper rack assembly 120 will be disposed above the rack assembly 314. The rack assembly 314 may generally include a bottom wall 316 and a plurality of side walls 318 defining an interior volume or wash compartment 319 for receiving articles to be washed. Each wall 316, 318 may be formed from a lattice structure, as described above. Optionally, the wash compartment 319 may receive the manifold body 304. Additionally or alternatively, the wash compartment 319 may selectively receive the basket 170 therein.

As illustrated in FIGS. 4 and 5, the fluid conduit 302 may be generally disposed inside the tub 104. Specifically, the fluid conduit 302 may be fixed to the tub 104 within the wash chamber 106. In some such embodiments, the fluid conduit 302 is mounted to the tub 104 via one or more mechanical fasteners (e.g., bolts, clasps, screws, ties, etc.). The fluid conduit 302 may define a conduit passage 322 extending between a conduit inlet 324 and a conduit outlet 326 (e.g., to direct wash fluid therethrough). The conduit inlet 324 may be attached to the diverting valve 194 to selectively receive wash fluid from the pump 142 (FIG. 2), as described above. For instance, a pair of male-female tabs 325 may be provided at the conduit inlet 324 to removably secure the fluid conduit 302 to the diverting valve 194. The conduit outlet 326 may selectively attach to the manifold body 304 (e.g., as the rack assembly 314 alternately moves in and out of wash chamber 106).

In some embodiments, the conduit passage 322 includes a Venturi portion 328 (see FIG. 5). The Venturi portion 328 may increase pressure of wash fluid upstream therefrom, while increasing the velocity of wash fluid being directing through the Venturi portion 328. Advantageously, the increased velocity of wash fluid being directed through the Venturi portion 328 may reduce the amount of washing liquid that might otherwise leak (e.g., from the drain hole 332 during operation).

An air gap 330 may be defined (e.g., in the vertical direction V) between a bottom portion of the fluid conduit 302 and a wall of the tub 104. For instance, as illustrated, the air gap 330 may be defined between the fluid conduit 302 and the bottom wall 162. Optionally, a drain hole 332 may be defined through the fluid conduit 302 (e.g., at the bottom portion of the fluid conduit 302). The drain hole 332 may be in fluid communication between the conduit passage 322 and the wash chamber 106 or air gap 330. In certain embodiments, the drain hole 332 is defined through the fluid conduit 302 along the Venturi portion 328. Once pressurized fluid is no longer supplied to the fluid conduit 302 (e.g., from the pump 142—FIG. 2), fluid remaining in the conduit passage 322 may flow to the chamber 106 through the drain hole 332 (e.g., as motivated by gravity and the shape of the fluid conduit 302).

As is known, liquid (e.g., water) supplied to dishwashing appliance 100 may be supplied at a maximum supply temperature. For instance, dishwashing operations are typically performed at a relatively high temperature (e.g., above 120° F.). Accordingly, water supplied to chamber 106 and, in turn, to fluid conduit 302, may be heated to the maximum supply temperature, for instance, by a domestic water heater within the domicile in which the dishwashing appliance 100 is located. As will be described in further detail below, certain operations performed within the dishwashing appliance (e.g., cooking operations) may require water (e.g., liquid or fluid) to be heated beyond the maximum supply temperature. Accordingly, dishwashing appliance 100 may further include an auxiliary heater 382.

In some embodiments, auxiliary heater 382 is in thermal communication with fluid conduit 302. As shown in FIG. 2, for example, auxiliary heater 382 is attached to a proximal portion of fluid conduit 302. A location of auxiliary heater 382 may vary according to specific embodiments, however, and the disclosure is not limited to the position shown. Auxiliary heater 382 may be an electric heating element. For instance, an electric current may be supplied to a heating element to supply additional heat to the fluid flowing through fluid conduit 302. However, it should be understood that any suitable heating element or process may be incorporated into auxiliary heater 382. Auxiliary heater 382 may be connected with controller 146 to receive signals therefrom. Accordingly, in response to certain inputs, controller 146 may selectively activate auxiliary heater 382.

Figure 6:
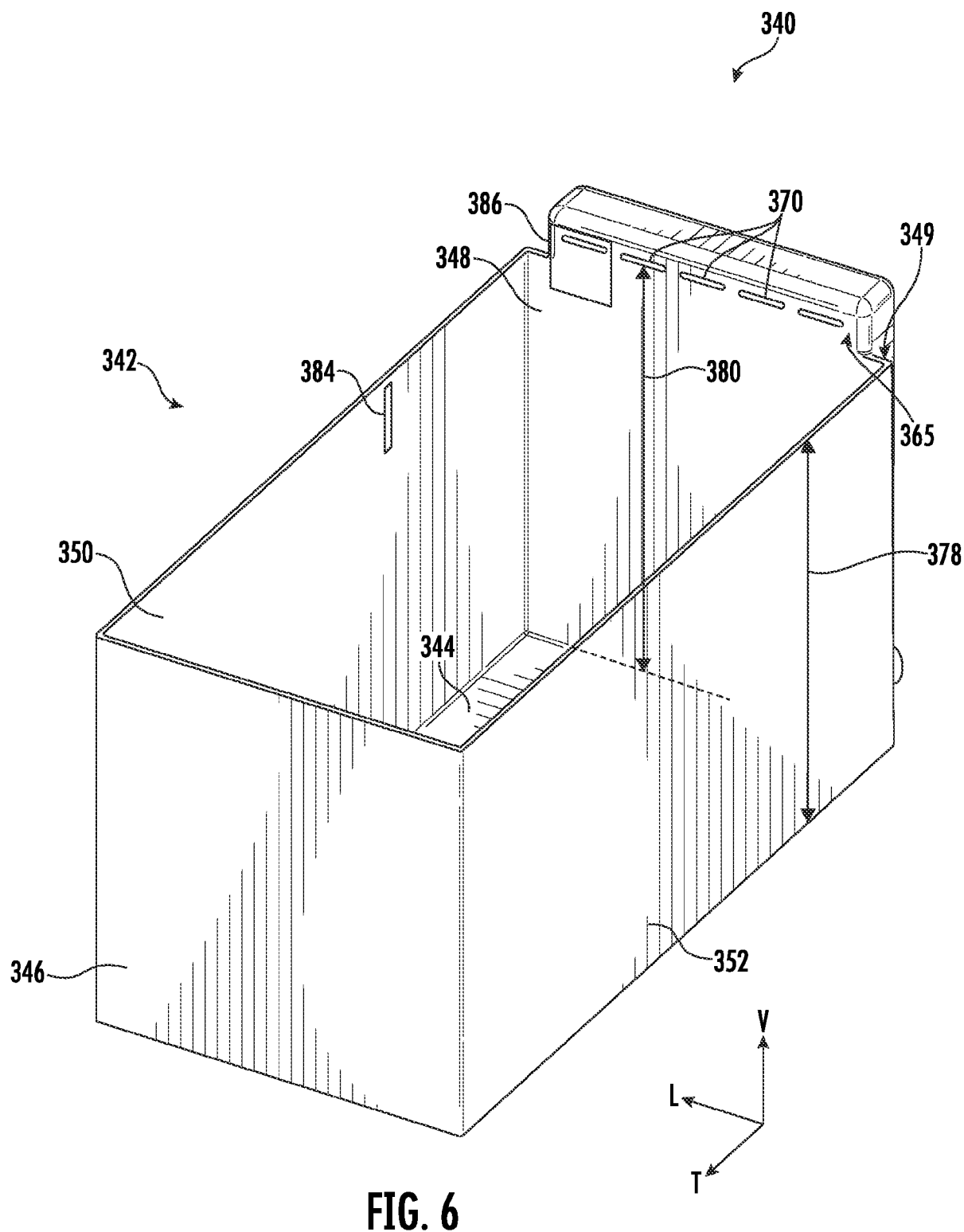
FIG. 6 provides a front perspective view of an exemplary sous-vide assembly according to embodiments of the present disclosure.
Figure 7:
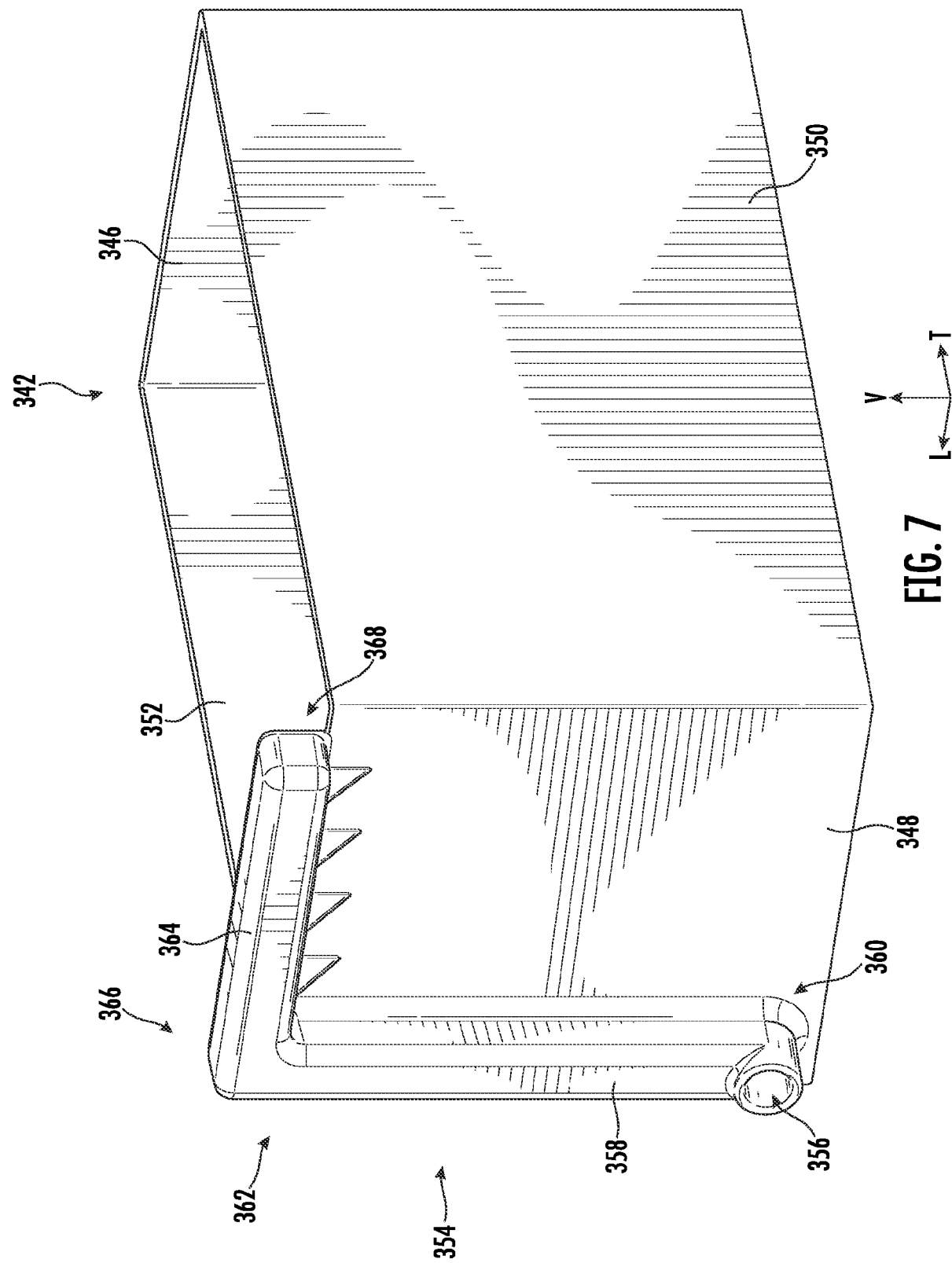
FIG. 7 provides a rear perspective view of the exemplary sous-vide assembly of FIG. 6.
Figure 8:
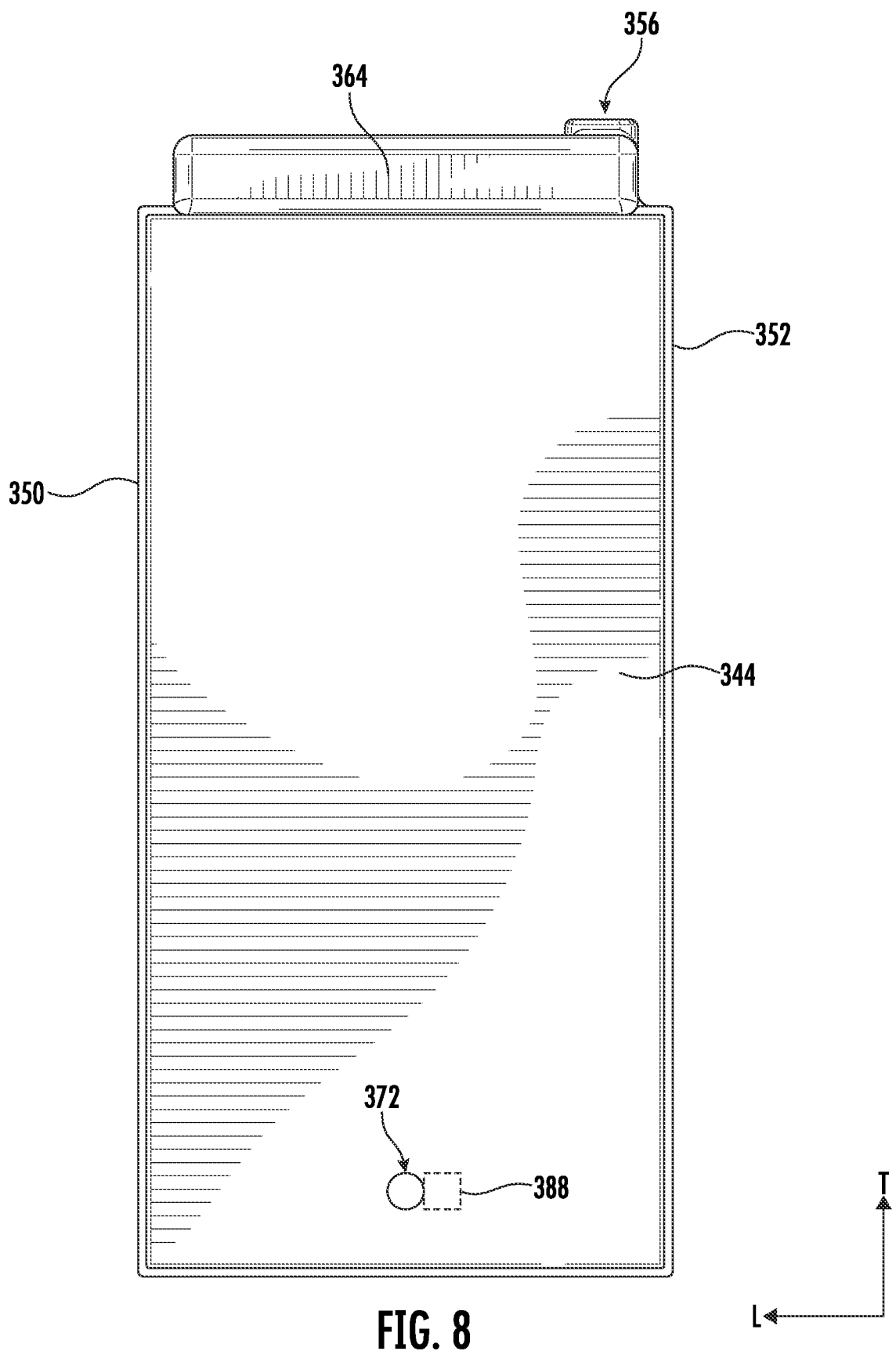
FIG. 8 provides a top view of the exemplary sous-vide assembly of FIG. 6.

Referring now to FIGS. 6 through 8, a sous-vide assembly for dishwashing appliance 100 will be described in detail. As will be described in more detail below, sous-vide assembly 340 may be detachably coupled to fluid conduit 302 (e.g., via conduit outlet 326). Additionally or alternatively, sous-vide assembly 340 may be attached to or supported by rack assembly 314. In detail, sous-vide assembly 340 may be located within one of upper rack assembly 120 or lower rack assembly 122. Thus, sous-vide assembly 340 may be selectively supplied with liquid or fluid (e.g., water or wash fluid) from pump 142 via fluid conduit 302. A detailed description of sous-vide assembly 340 is provided hereinafter.

Sous-vide assembly 340 may include a container 342. As shown in FIG. 6, container 342 may be predominantly rectangular in shape. For instance, container 342 may include a floor 344, and a plurality of sidewalls extending from the floor, e.g., along the vertical direction V. The plurality of sidewalls may include a front wall 346, a rear wall 348, a first sidewall 350, and a second sidewall 352. According to some embodiments, container 342 does not include a cover. For instance, an interior volume formed by the plurality of sidewalls and floor 344 may be open to the ambient atmosphere within chamber 106.

Each of the plurality of sidewalls may be solid (e.g., fluid tight). Thus, fluid supplied to container 342 may be stored within container 342, e.g., for at least a predetermined amount of time. Accordingly, container 342 may be made or formed from a liquid tight material (e.g., glass, plastic, polymer, metal, or the like). According to at least some embodiments, container 342 includes an insulating material configured to retain heat in the fluid stored within container 342. Additionally or alternatively, a secondary insulating material may be applied to each of the plurality of sidewalls as well as floor 344.

Floor 344 may have an outlet hole 372 defined therein. As shown in FIG. 8, outlet hole 372 may be defined through floor 344 along the vertical direction V. Accordingly, fluid stored within container 342 may selectively drain from container 342 via outlet hole 372. Outlet hole 372 may be provided at or near front wall 346. For instance, outlet hole 372 may be closer to front wall 346 than rear wall 348. As will be described further below, outlet hole 372 maybe located on an opposite end of container 342 from an inlet hole. Further, according to some embodiments, outlet hole 372 is provided at a lateral midpoint of floor 344. However, a placement of outlet hole 372 is not limited, and any suitable position for outlet hole 372 may be used as would be understood.

Outlet hole 372 may define a first cross-sectional area. For instance, a size of outlet hole 372 may be defined such that a predetermined flow rate of liquid from container 342 to chamber 106 may be known. Moreover, the predetermined flow rate of liquid from container 342 may be regulated due to the cross-sectional area of outlet hole 372. In at least some embodiments, the cross-sectional area of outlet hole 372 is formed as a percentage of a cross-sectional area of an inlet (explained below). The percentage may be less than 100%. In detail, the cross-sectional area of outlet hole 372 may be less than the cross-sectional area of the inlet. Accordingly, a flow of liquid into container 342 may be greater than a flow of liquid from container 342, thus ensuring that during certain operations (e.g., a sous-vide cooking operation), a minimum level of liquid within container 342 may be maintained. According to at least one embodiment, the first cross-sectional area may be predetermined according to a flow rate of liquid from pump 142 such that the flow rate of liquid through the inlet is greater than the flow rate of liquid through outlet hole 372.

Sous-vide assembly 340 may include a conduit dock 354. As shown in FIG. 7, conduit dock 354 may be provided at rear wall 348 of container 342. Conduit dock 354 may be attached to an outer surface of rear wall 348. In at least some embodiments, conduit dock 354 is formed integrally with rear wall 348 (e.g., as a single piece). Conduit dock 354 may allow sous-vide assembly 340 (e.g., container 342) to be selectively connected with fluid conduit 302. For instance, conduit dock 354 may provide fluid communication between container 342 and fluid conduit 302. Thus, fluid may be selectively supplied to container 342. Further, conduit dock 354 may include a first passage 358 and a second passage 364.

First passage 358 may extend along the vertical direction V, e.g., from a bottom to a top of rear wall 348. Thus, first passage 358 may define a first end 360 and a second end 362 opposite first end 360. First end 360 may be provided at or near the bottom of rear wall 348. Additionally or alternatively, first end 360 may be provided at or near a lateral edge of rear wall 348. An exact positioning of first end 360 (e.g., along the lateral direction L and/or the vertical direction V) may vary according to a style and positioning of fluid conduit 302. For instance, a dock inlet 356 may be defined at first end 360 of first passage 358.

Dock inlet 356 may be an inlet opening allowing fluid communication between fluid conduit 302 and first passage 358 of conduit dock 354. In detail, dock inlet 356 may be shaped complimentary to conduit outlet 326 of fluid conduit 302. According to some embodiments, dock inlet 356 may be cylindrically shaped so as to mate with conduit outlet 326. For instance, dock inlet 356 may be a male connection and conduit outlet 326 may be a female connection. Thus, dock inlet 356 may fit into conduit outlet 326. A gasket or seal may be provided on one or both of dock inlet 356 and conduit outlet 326. Thus, a fluid tight connection between conduit dock 354 and fluid conduit 302 may be assured.

Second passage 364 may extend from first passage 358. In detail, second passage 364 may define a first end 366 and a second end 368 opposite first end 366. Second passage 364 may extend along the lateral direction L. Additionally or alternatively, second passage 364 may be located at or near the top of rear wall 348. For instance, second passage 364 may extend along the lateral direction L along a top edge 349 of rear wall 348. Thus, second passage 364 may be positioned above rear wall 348 along the vertical direction V. First end 366 of second passage 364 may be connected with second end 362 of first passage 358. In detail, first end 366 may be in fluid communication with second end 362. Thus, fluid flowing through conduit dock 354 (e.g., from fluid conduit 302) may flow from first passage 358 into second passage 364. For instance, fluid may be supplied under pressure from pump 142 in order to travel through first passage 358 and second passage 364.

A plurality of inlet holes 370 may be formed in second passage 364. As shown in FIG. 6, inlet holes 370 may be formed in a front surface 365 of second passage 364. Fluid delivered to second passage 364 may exit conduit dock 354 via inlet holes 370. Inlet holes 370 may thus be provided above top edge 349 of rear wall 348. According to one example, with reference to FIG. 6, a vertical distance 380 between inlet holes 370 and floor 344 of container 342 is greater than a height 378 of container 342. Accordingly, fluid may spill from inlet holes 370 into container 342 over rear wall 348, selectively filling container 342. According to some embodiments, at least five inlet holes 370 are provided. However, the number and size of inlet holes 370 may vary according to specific embodiments. Inlet holes 370 may be evenly spaced along second passage 364 (e.g., along the lateral direction L). Additionally or alternatively, each of the inlet holes 370 may be elongated along the lateral direction L. Thus, the fluid may be supplied at an even flow rate and avoid splashing within container 342.

The plurality of inlet holes 370 may define a second cross-sectional area. As described above, the second cross-sectional area may be greater than the first cross-sectional area (e.g., of outlet hole 372). In detail, the collective cross-sectional area of inlet holes 370 (e.g., as seen in FIG. 6) may be greater than the cross-sectional area of outlet hole 372. Thus, the amount of liquid supplied to container 342 (e.g., via the plurality of inlet holes 370) is greater than the amount of liquid drained from container 342 (e.g., via outlet hole 372).

According to still other embodiments, second passage 364 may extend along the transverse direction T (e.g., along a top of one of first sidewall 350 or second sidewall 352). According to these embodiments, inlet holes 370 may be formed along a sidewall of second passage 364 (e.g., facing the lateral direction L). It should be understood that variations in positions, sizes, and orientations of first passage 358 and second passage 364 would be obvious to those having ordinary skill in the art.

Sous-vide assembly 340 may include a first flowmeter 386 and a second flowmeter 388. First flowmeter 386 may be provided at or near inlet holes 370 on second passage 364. In some embodiments, first flowmeter 386 may be configured to detect an amount of fluid provided to container 342. First flowmeter 386 may be any suitable type of flow meter or flow sensor, such as a mechanical flow meter, a vortex flow meter, an ultrasonic flow meter, or the like. First flowmeter 386 may thus send signals regarding the amount of fluid dispensed into container 342 to controller 146. Additionally or alternatively, first flowmeter 386 may be an optic sensor to detect when fluid is flowing into container 342. Controller 146 may then calculate an amount of fluid added to container 342 by multiplying an amount of time the optic sensor is triggered by a known flow rate of fluid (e.g., from pump 142).

Second flowmeter 388 may be provided at or near outlet hole 372 on floor 344. Second flowmeter 388 may be configured to detect an amount of fluid exiting container 342. Second flowmeter 388 may be any suitable type of flow meter or flow sensor, such as a mechanical flow meter, a vortex flow meter, an ultrasonic flow meter, or the like. Second flowmeter 388 may thus send signals regarding the amount of fluid released from container 342 to controller 146. Additionally or alternatively, second flowmeter 388 may be an optic sensor to detect when fluid is flowing out of container 342. Controller 146 may then calculate an amount of fluid released from container 342 by multiplying an amount of time the optic sensor is triggered by a known flow rate of fluid (e.g., from pump 142).

Sous-vide assembly 340 may include additional or alternative means for determining and maintaining the fluid level within container 342. For instance, sous-vide assembly may include a float device or float sensor. Float sensor may communicate with controller 146. When the level of fluid within container 342 reaches a first predetermined amount or threshold, the float sensor may alert controller 146 to deactivate pump 142 and halt the supply of fluid to container 342. Further, when the level of fluid within container 342 reaches a second predetermined amount or threshold (e.g., less than the first predetermined amount due to drainage), the float sensor may alert controller 146 to reactivate pump 142 to resupply fluid to container 342. According to yet another embodiment, one or more optical sensors may be installed within container 342 to detect a level of fluid within container 342. The one or more optical sensors may operate similar to the float sensor or flowmeters.

Sous-vide assembly 340 may include a temperature sensor 384 provided within container 342. As used herein, "temperature sensor" or the equivalent is intended to refer to any suitable type of temperature measuring system or device positioned at any suitable location for measuring the desired temperature. Thus, for example, temperature sensor 384 may be any suitable type of temperature sensor, such as a thermistor, a thermocouple, a resistance temperature detector, a semiconductor-based integrated circuit temperature sensor, etc. In addition, temperature sensor 384 may be positioned at any suitable location and may output a signal, such as a voltage, to a controller (e.g., controller 146) that is proportional to and/or indicative of the temperature being measured. Although exemplary positioning of temperature sensors is described herein, it should be appreciated that appliance 100 may include any other suitable number, type, and position of temperature and/or other sensors according to alternative embodiments. Thus, temperature sensor 384 may detect and transmit a temperature of the fluid within container 342 to controller 146. For instance, temperature sensor 384 may continually monitor the temperature of the fluid within container 342 and periodically send updates to controller 146. Thus, a specific temperature may be maintained for the fluid within container 342.

Hereinafter, a method of controlling dishwashing appliance 100 will be described (e.g., via a remote device). Referring to FIG. 1, a schematic diagram of an external communication system 200 will be described according to an exemplary embodiment of the present subject matter. In general, external communication system 200 is configured for permitting interaction, data transfer, and other communications between appliance 100 and one or more external devices. For example, this communication may be used to provide and receive operating parameters, user instructions or notifications, performance characteristics, user preferences, or any other suitable information for improved performance of appliance 100. In addition, it should be appreciated that external communication system 200 may be used to transfer data or other information to improve performance of one or more external devices or appliances and/or improve user interaction with such devices.

For example, external communication system 200 permits controller 146 of appliance 100 to communicate with a separate device external to appliance 100, referred to generally herein as an external device 172. As described in more detail below, these communications may be facilitated using a wired or wireless connection, such as via a network 174. In general, external device 172 may be any suitable device separate from appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with appliance 100 and/or external device 172 through network 174. In this regard, for example, remote server 176 may be a cloud-based server, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control appliance 100, etc. In addition, external device 172 and remote server 176 may communicate with appliance 100 to communicate similar information.

In general, communication between appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 200 is described herein according to an exemplary embodiment of the present subject matter. However, it should be appreciated that the exemplary functions and configurations of external communication system 200 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

As described above, dishwashing appliance 100 may be configured to perform a sous-vide cooking operation (e.g., using sous-vide assembly 340). According to at least some embodiments, this sous-vide operation may be performed using, or with the assistance of, a mobile application (mobile app) on a mobile device (e.g., mobile telephone, tablet, computer, etc.). For instance, a user may input a command to perform the sous-vide cooking operation through the mobile app or through control panel 148 on appliance 100. Additionally or alternatively, the user may select or manipulate one or more input options for performing the sous-vide cooking cycle. Features and options related to the sous-vide cooking operation may be stored on a remote server (e.g., remote server 176), and thus the complexity of the onboard user interface (e.g., control panel 148) of appliance 100 may be simplified, reducing costs for production, maintenance, and operation.

For example, a list of preset (or predetermined) settings may be provided to the user (e.g., via the mobile app or control panel 148). The list of preset settings may include input options which adjust the cooking operation. The input options may include, for example, a type of food (e.g., meat, poultry, etc.) to be cooked, a number of items to be cooked, a desired temperature at which to perform the cooking operation, a desired attribute of the food to be cooked, a cooking time, or the like. The user may select one or more of the preset options. In some embodiments, a second selection is prompted to the user. For example, when selecting a meat product to be cooked, the user may then select a level of rarity of the meat (e.g., rare, medium-rare, medium, medium-well, well done, etc.). Assigned cooking times may be associated with each input option or a combination of input options. For instance, the cooking times associated with each input option may be stored in a look-up table (e.g., on remote server 176 or locally on appliance 100). Thus, after the user selects the desired options, the controller may look up the associated time from the look-up table.

Certain advanced options may be available for the user to select or alter. For example, the user may select a specific temperature at which to perform the sous-vide cooking operation. Additionally or alternatively, the user may select a specific time at which to perform the cooking operation. For example, the user may place items to be cooked into the sous-vide container (e.g., container 342) and select a later time to initiate the cooking (e.g., while the user is away from the appliance).

The mobile app may further allow the user to store certain selected input options for future quick use. For instance, if a particular meat is desired at a particular temperature (or rarity) and is typically cooked at a particular time, these settings may be saved to a user profile for quick future access (e.g., via remote server 176). Additionally or alternatively, the user may share the user profile to a social media application or account. Accordingly, the user may share specific recipes or cooking selections to others via social media. Moreover, the user may discover new recipes or methods through other similar users.

In some embodiments, certain operating parameters of the appliance (or sous-vide assembly) may be monitored, e.g., by the controller (e.g., controller 146). These operating parameters may be compared to predetermined standard operating parameters. In at least one example, a time required for a temperature of the liquid supplied to the container may be monitored. If the time taken is longer than a predetermined standard amount of time, the use may be notified or alerted. Additionally or alternatively, a repair technician may be notified of a potential fault of the appliance or sous-vide assembly. Further, operating parameters such as water pressure, cooking time, maximum temperature, fill rates, and the like may be monitored. It should be understood that a plethora of operating parameters may be monitored, and the disclosure is not limited to those described herein.

Figure 9:
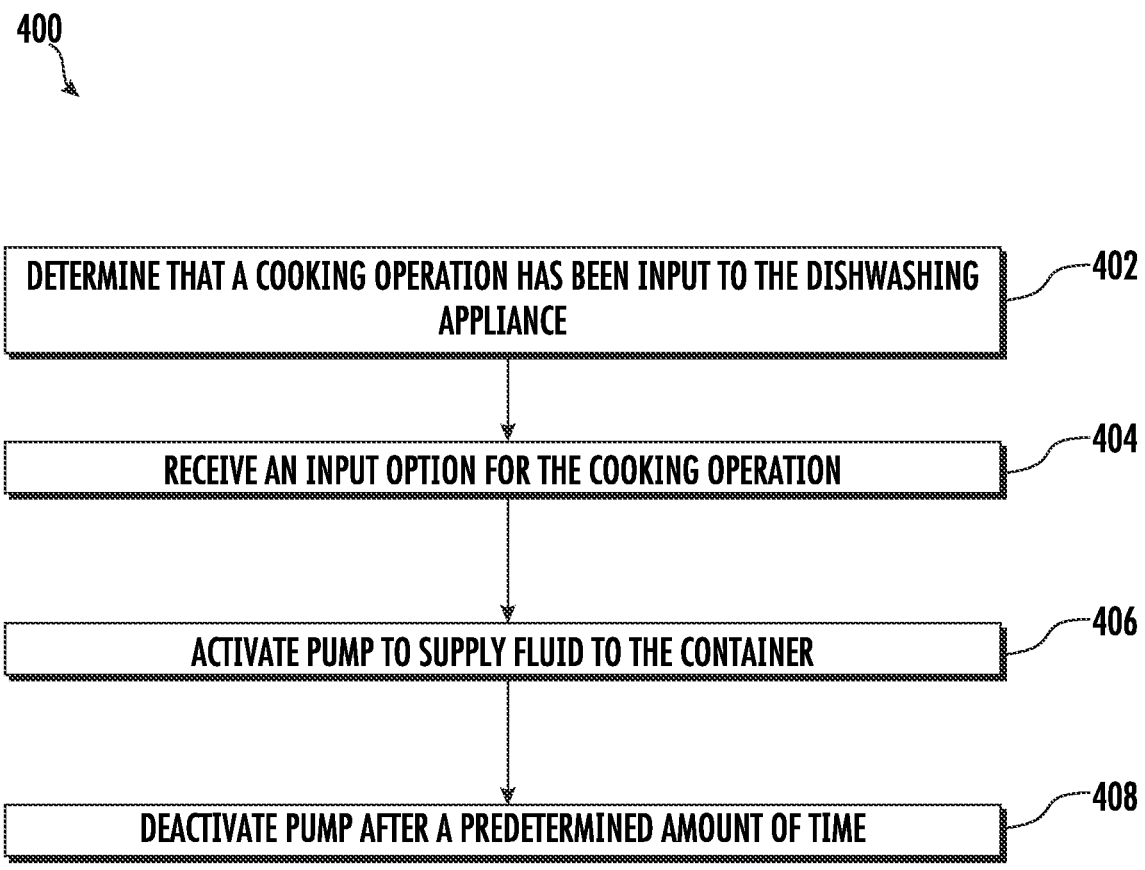
FIG. 9 provides a flowchart illustrating a method of operating a dishwashing appliance.

Referring now to FIG. 9, at step 402, method 400 may include determining that a cooking operation has been input to the dishwashing appliance. For instance, the controller may determine that a user has initiated a sous-vide cooking operation to be performed within the dishwashing appliance. The cooking operation may be input via the mobile device. In detail, the user may access a mobile application on the mobile device and select a cooking operation (e.g., a sous-vide cooking operation). Additionally or alternatively, the user may select the cooking operation via the control panel on the dishwashing appliance.

At step 404, method 400 may include receiving an input option for the cooking operation. The user may in turn select one or more input options related to the cooking operation via the mobile device. For instance, the mobile app may include a list of preset or predetermined settings or options. The preset options may be related to various attributes regarding the cooking operation or the food to be cooked. In at least some embodiments, the preset options include choosing the type of food to be cooked (e.g., meat, poultry, fish, vegetables, etc.), a desired attribute of the food (e.g., meat rarity, softness, etc.), a number of items to be cooked, a desired temperature of the food, a total cooking time, or the like. It should be understood that the preset options may include more or fewer features, and the disclosure is not limited to those listed here.

The input options may include advanced settings. The advanced settings may be optionally selected by the user, e.g., after any preset options are selected. For instance, the advanced settings may include features such as a precise temperature of the fluid at which to cook the items (e.g., in place of a selected rarity level), a precise time at which to begin and/or complete the cooking operation, or the like. In detail, the user may opt to have the sous-vide cooking operation performed while the user is away from the appliance (e.g., at work, running errands, etc.). The user may select one or more of a start time, an end time, or a total elapsed time. Additionally or alternatively, the user may select a plurality of different food items (e.g., a meat product, a vegetable product, etc.). The mobile app may alert the user as to which items can or should not be cooked together (e.g., due to different temperature requirements, etc.).

According to some embodiments, the controller may determine that a specific temperature is required to perform the requested cooking operation (e.g., for a particular selected food item). As discussed above, the heated water (e.g., fluid) supplied to the dishwashing appliance may be restricted to the maximum supply temperature. In the case where a temperature above the maximum supply temperature is required, the controller may activate an auxiliary heater (e.g., auxiliary heater 382). Accordingly, additional heat may be supplied to the fluid added to the container in order to ensure the specific temperature is reached and maintained.

At step 406, method 400 may include activating the pump to supply fluid to the container. The fluid may be supplied at a predetermined temperature (e.g., as required by the selected input options). For instance, the auxiliary heater may be activated to increase the temperature of the fluid beyond the maximum supply temperature. According to some embodiments, the fluid may be supplied for a predetermined amount of time. The predetermined amount of time may be calculated (e.g., by the controller) based on a flow rate of fluid, a capacity of the container, and an amount (or size) of items added to the container. Further, the flow rate of fluid into the container may be altered (e.g., via the controller and the pump). Accordingly, a level of fluid within the container may be ensured.

Further, the fluid may be supplied such that the amount of fluid within the container is above a first predetermined amount or threshold. The predetermined threshold may be calculated similarly to the predetermined amount of time. In detail, the controller may take into consideration the flow rate of fluid into the container, the maximum volume or capacity of the container, and the amount or size of items (e.g., food or cooking items) added to the container.

At step 408, method 400 may include deactivating the pump after the predetermined amount of time. In detail, the controller may determine that the amount of fluid within the container is above the first predetermined amount or threshold. For instance, the controller may detect an amount of fluid within the container (e.g., according to a flow rate and a duration of the pump "on" time). Additionally or alternatively, the controller may calculate that the amount of fluid within the container is above the first predetermined amount. For another example, the flow rate of fluid into the container may be known, together with the volume of the container and the occupied space of the container by the food items. Thus, the controller may calculate a time for which the pump must be activated in order to fill the container past the first predetermined amount.

According to some embodiments, the controller determines a flow rate of fluid into the container via a first flowmeter (e.g., first flowmeter 386). Thus, the amount of fluid within the container may be calculated via the measured flow rate. Additionally or alternatively, the controller may determine a flow rate of fluid out of the container (e.g., via an outlet hole) via a second flowmeter (e.g., second flowmeter 388). Utilizing each of these measurements, the controller may continually determine a level of fluid within the container. For instance, after having determined that the fluid level within the container is above the first predetermined amount and having deactivated the pump, the controller may determine the flow rate of fluid from the container (e.g., by the second flowmeter or by calculation using a size or cross-sectional area of the outlet hole).

The controller may then determine that the level of fluid within the container has reached a second predetermined amount. The second predetermined amount may be less than the first predetermined amount. Thus, the controller may determine that the level of fluid within the container has dropped, and that additional fluid must be added to the container. Accordingly, the controller may activate the pump to resupply fluid to the container. Similar to the initial supplying of fluid to the container, the controller may determine when the fluid has reached the first predetermined amount within the container and subsequently deactivate the pump. As would be understood, this process may be repeated throughout the cooking operation to ensure a proper level of fluid is maintained within the container. Additionally or alternatively, the continual resupplying of fluid to the container may ensure that the proper temperature is maintained within the container (e.g., within the fluid in the container), thus accurately performing the cooking operation.

In still other embodiments, the container includes a fluid level sensor (e.g., float switch) by which a level or amount of fluid within the container is monitored. According to this embodiment, the controller may receive routine fluid level readings from the fluid level sensor and determine the amount of fluid within the container. Accordingly, the pump may be activated and deactivated according to the amount of fluid within the container as determined by the fluid level sensor.

As described herein, a method of operating a dishwashing appliance to perform a sous-vide cooking operation is disclosed. Additionally or alternatively, a method of using a mobile device and remote server to perform the sous-vide cooking operation is disclosed. A solid-walled container may be attached to a fluid conduit within the tub of a dishwashing appliance. Water or fluid may be selectively supplied to the container at a predetermined temperature for cooking food items. The level of fluid within the container may be monitored, for instance, by fluid level sensors, flowmeters, or by calculating a flow rate of fluid into the container. Various input options for cooking preferences may be input by a user via the mobile device. Cooking times for the food items and desired preferences may be stored on a lookup table, for instance on a remote server. Upon placing the items to be cooked into the container, the user may initiate the cooking operation, for example, via the mobile device. Accordingly, an efficient and cost-effective manner of performing a sous-vide cooking operation is possible. Additionally or alternatively, by utilizing a remote server and mobile device including a mobile application, the user interface of the dishwashing appliance may be simplified, decreasing manufacturing, maintenance, and operational costs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of controlling a dishwashing appliance, the dishwashing appliance comprising a tub defining a chamber, a fluid conduit provided within the chamber, a pump configured to urge fluid through the fluid conduit, and a container provided within the chamber and fluidly connected with the fluid conduit, the method comprising:
   determining that a cooking operation has been input to the dishwashing appliance;
   receiving an input option for the cooking operation; and
   activating the pump to supply a fluid to the container at a predetermined temperature, wherein the container comprises an inlet portion and an outlet portion, and wherin the fluid is supplied to the container via the inlet portion.

2. The method of claim 1, wherein activating the pump to supply the fluid to the container further comprises:
   activating the pump at a first flow rate; and
   determining that an amount of fluid in the container is above a first predetermined amount.

3. The method of claim 2, further comprising:
   deactivating the pump in response to determining that the amount of fluid in the container is above the first predetermined amount;
   determining that the amount of fluid in the container is below a second predetermined amount, the second predetermined amount being less than the first predetermined amount; and
   activating the pump to resupply the fluid to the container.

4. The method of claim 1, wherein the cooking operation and input option are input via a mobile device in remote communication with the dishwashing appliance, and wherein the input option comprises at least one of a type of a food, a desired attribute of the type of food, an amount of items, a temperature of the food, or a cooking time.

5. The method of claim 4, wherein the dishwashing appliance further comprises an auxiliary heater in thermal communication with the fluid conduit, the method further comprising:
   determining that the predetermined temperature of the fluid is higher than a maximum supply temperature of the fluid; and
   activating the auxiliary heater to increase the temperature of the fluid to the predetermined temperature.

6. The method of claim 4, further comprising:
   determining that the input option is the desired attribute of the type of food, the desired attribute being a rarity level of a meat;
   retrieving, via the mobile device, a stored cooking time associated with the rarity level in response to the input option; and
   initiating the cooking operation.

7. The method of claim 4, further comprising:
   determining that the input option is the amount of items;
   retrieving, via the mobile device, a stored cooking time associated with the amount of items in response to the input option; and
   initiating the cooking operation.

8. The method of claim 4, further comprising:
   determining that the input option is the temperature of the food;
   retrieving, via the mobile device, a stored cooking time associated with the selected temperature of the food; and
   initiating the cooking operation.

9. The method of claim 4, further comprising:
   storing the input option for the cooking operation on a remote server; and
   transmitting the stored input option to the mobile device.

10. The method of claim 1, further comprising:
    monitoring one or more operating parameters of the dishwashing appliance;
    comparing the one or more operating parameters to predetermined standard operating parameters;

determining that the one or more operating parameters are different from the predetermined standard operating parameters by a predetermined factor; and alerting a user that the one or more operating parameters are different from the predetermined standard operating parameters.

11. A method of performing a sous-vide cooking operation within a dishwashing appliance, the dishwashing appliance comprising a tub forming a chamber, a pump configured to deliver a fluid to the chamber, a container provided within the chamber, and a temperature sensor provided within the container, the method comprising:

determining that the sous-vide cooking operation has been input to the dishwashing appliance;

receiving an input option for the sous-vide cooking operation via a mobile device;

determining a cooking time for the sous-vide cooking operation in response to receiving the input option;

activating the pump to supply the fluid to the container; and monitoring a temperature of the fluid within the container via the temperature sensor, wherein the container comprises a plurality of solid walls and is configured to selectively store an amount of the fluid, and wherein the container comprises an inlet portion and an outlet portion, and wherein the fluid is supplied to the container via the inlet poriton.

12. The method of claim 11, wherein activating the pump to supply the fluid to the container further comprises:

activating the pump at a first flow rate; and determining that an amount of fluid in the container is above a first predetermined amount.

13. The method of claim 12, further comprising:

deactivating the pump in response to determining that the amount of fluid in the container is above the first predetermined amount;

determining that the amount of fluid in the container is below a second predetermined amount, the second predetermined amount being less than the first predetermined amount; and activating the pump to resupply the fluid to the container.

14. The method of claim 11, wherein the input option comprises at least one of a type of a food, a desired attribute of the type of food, an amount of items, a temperature of the food, or a cooking time.

15. The method of claim 14, wherein the dishwashing appliance further comprises a conduit fluidly coupled between the container and the pump and an auxiliary heater in thermal communication with the conduit, the method further comprising:

determining that a predetermined temperature of the fluid is higher than a maximum supply temperature of the fluid; and activating the auxiliary heater to increase the temperature of the fluid to the predetermined temperature.

16. The method of claim 14, further comprising:

determining that the input option is the desired attribute of the type of food, the desired attribute being a rarity level of a meat;

retrieving a stored cooking time associated with the rarity level in response to the input option; and initiating the cooking operation.

17. The method of claim 14, further comprising:

determining that the input option is the amount of items;

retrieving a stored cooking time associated with the amount of items in response to the input option; and initiating the cooking operation.

* * * * *